United States Patent [19]
Cucheran

[11] 3,807,204
[45] Apr. 30, 1974

[54] SPARE TIRE LOCK

[75] Inventor: John S. Cucheran, Pleasant Ridge, Mich.

[73] Assignee: John A. Bott, Grosse Pointe Shores, Mich.

[22] Filed: Nov. 15, 1972

[21] Appl. No.: 306,917

[52] U.S. Cl. .................................. 70/231, 70/259
[51] Int. Cl. ............................................. F16b 41/00
[58] Field of Search ............ 70/165, 188, 221, 231, 70/259

[56] References Cited
UNITED STATES PATENTS
1,678,174  7/1928  White ................................. 70/231
1,592,630  7/1926  Ganz ................................... 70/221
1,462,404  7/1923  White ................................. 70/165

Primary Examiner—Albert G. Craig, Jr.
Attorney, Agent, or Firm—Harness, Dickey & Pierce

[57] ABSTRACT

A compact, key-actuated lock for an automobile spare tire. The lock is threaded onto the spare tire hold-down bolt and is locked thereon to prevent unauthorized removal of the spare tire.

11 Claims, 6 Drawing Figures

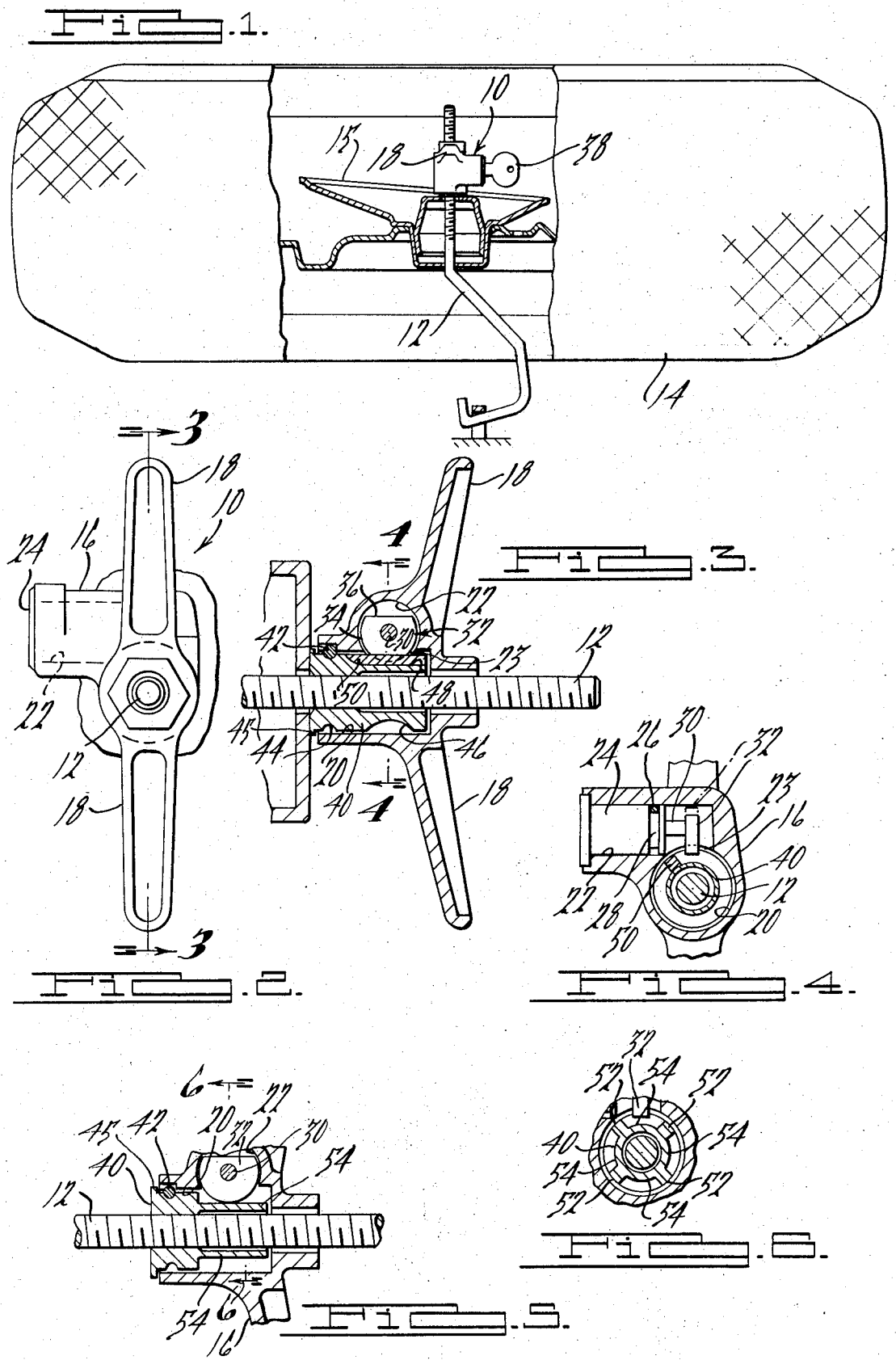

SPARE TIRE LOCK

BACKGROUND AND SUMMARY OF THE INVENTION

The present invention relates to a key-actuated lock of the type adapted to be threaded onto a threaded shaft and locked thereon and is particularly suited for locking a spare tire.

One of the objects of the present invention is to provide a key-actuated lock for locking a spare tire which is especially compact and readily accessible for locking and unlocking.

Another object is to provide a lock of the type described which is less complex than prior locks, and which requires minimum effort to lock and unlock.

The foregoing objects as well as additional objects, advantages and benefits of the invention will be seen in the ensuing description and claims which are to be taken in conjunction with the accompanying drawings.

BRIEF DESCRIPTION OF THE DRAWINGS

The drawings illustrate a preferred embodiment of the invention in accordance with the best mode presently contemplated for carrying out the invention.

FIG. 1 is a side-elevational view having a portion broken away showing the spare tire lock of the present invention locking a spare tire.

FIG. 2 is a top view of the lock of the present invention.

FIG. 3 is a vertical sectional view taken along line 3—3 in FIG. 2.

FIG. 4 is a horizontal sectional view taken along line 4—4 in FIG. 3.

FIG. 5 is a view similar to FIG. 3 showing a further embodiment of the invention.

FIG. 6 is a horizontal sectional view taken along line 6—6 in FIG. 5.

DESCRIPTION OF THE PREFERRED EMBODIMENT

In FIG. 1, the key-actuated lock 10 of the present invention is threaded onto the threaded end of a spare tire hold-down bolt 12 to lock a spare tire 14 in the stowed position. Although lock 10 is suitable for use with various tire stowage arrangements, FIG. 1 illustrates lock 10 tightened against a jack base 15 to secure tire 14.

The details of lock 10 are shown in FIGS. 2, 3 and 4 and the lock is seen to comprise a housing 16 fashioned with radial arms 18 projecting outwardly from diametrically opposite sides thereof. Housing 16 is provided with an axial bore 20 and a tangential bore 22. The axes of bores 20 and 22 are skew (i.e., non-intersecting) with the axis of bore 22 being spaced radially outwardly of the wall of bore 20 such that the side wall of bore 22 intersects the side wall of bore 20 to provide an opening 23 between the two bores.

A conventional key-actuated cylinder lock 24 is mounted in bore 22. Lock 24 is rotatable within bore 22 but is axially constrained by means of a pin 26 inserted into a suitable hole in housing 16 and tangentially engaging a circumferential groove 28 around cylinder 24. The inner end of cylinder 24 has an axial shaft 30 which supports a locking dog 32 within bore 22 opposite opening 23. Dog 32 is a truncated circular piece having a circular edge portion 34 of a radius slightly less than the radius of bore 22 and a straight edge portion 36 connecting the ends of circular portion 34. Dog 32 is dimensioned such that when straight edge portion 36 directly faces bore 20, no portion of dog 32 protrudes into bore 20. As is conventional, cylinder 24 can be rotated within bore 22 only when the proper key 38 is inserted.

A generally cylindrical, internally threaded sleeve 40 is disposed within bore 20, and is threaded onto bolt 12 when lock 10 is in use. Sleeve 40 is rotatable within bore 20 but is axially constrained by means of a pin 42 inserted into a suitable hole in housing 16 and tangentially engaging a circumferential groove 44 around sleeve 40. The left-hand end of sleeve 40 as viewed in FIG. 3 projects slightly beyond the end of housing 16 and has a circumferential shoulder 45 which abuts jack base 15. Sleeve 40 includes a second circumferential groove 46 axially inwardly of groove 44. Groove 46 is deeper and wider than groove 44 and is aligned with opening 23. An axial slot 48 is provided in sleeve 40 locally across groove 46. A key 50 is inserted into slot 48 and across groove 46, but does not protrude radially beyond the nominal diameter of sleeve 40.

When lock 10 is unlocked, dog 32 is in the position illustrated in FIG. 3 and in the solid line position of FIG. 4. In this position, the segment of circular edge portion 34 diametrically opposite straight edge portion 36 is disposed within bore 20 to radially overlap the portion of key 50 within groove 46. Now when housing 16 is rotated, dog 32 engages key 50 to couple sleeve 40 for rotation with housing 16. Thus, arms 18 may be grasped to turn housing 16 and thereby thread lock 10 onto bolt 12. Lock 10 is tightened against jack base 15 to secure tire 14.

With lock 10 tightened against jack base 15, key 38 is turned 180° to similarly rotate cylinder 24 and dog 32. Dog 32 now assumes the position illustrated by the broken lines in FIG. 4. The straight edge portion 36 directly faces bore 20 so that dog 32 is no longer within the path of travel of key 50 when housing 16 is rotated. Thus, sleeve 40 is rotatably decoupled from housing 16, and housing 16, when turned, will simply spin on sleeve 40 because sleeve 40 is frictionally held against rotation by being tightened against jack base 15. Without key 38, it is now impossible to nondestructively remove spare tire 14 since sleeve 40 is inaccessible for actuation.

In the modified form shown in FIGS. 5 and 6, sleeve 40 is provided with four equally circumferentially spaced axial ribs 52 opposite opening 23. When dog 32 is actuated to the unlocked position, circular edge portion 34 is received in one of the recesses 54 between adjacent ribs 52 to rotatively couple sleeve 40 to housing 16 upon rotation of the latter.

Because of the compact arrangement of lock 10, key 38 can be inserted into and removed from cylinder 24 at minimum radial distance from bolt 12, and this provides maximum radial clearance to the spare tire and the radially outer portions of the spare tire wheel which might otherwise interfere with free insertion and removal of key 38 in prior types of locks. Also, housing 16 requires minimum material, but is nonetheless strong and rugged. Moreover, the lock requires a minimum number of parts and once key 38 is inserted into cylinder 24 the lock may be readily operated to either the locked or unlocked position with minimum effort.

Thus, the invention provides a compact lock well-suited for locking a spare tire.

I claim:

1. In a spare tire locking device of the type adapted to be manually threaded onto a threaded shaft and locked thereon so as to tightly hold a spare tire in storage with a desired degree of tightness, the combination comprising an actuating member, means defining a pair of bores in said member, said bores being arranged to intersect each other such that an opening is defined between the side walls thereof, means for rotating said actuating member about the axis of one of said bores, an internally threaded sleeve disposed in said one bore and adapted to be threaded onto the threaded shaft, said sleeve being rotatable within said one bore and constrained against substantial displacement axially thereof, a key-actuated lock in the other of said bores operable between locked and unlocked positions and coupling means operatively coupling said lock and said sleeve via said opening such that said sleeve is coupled for rotation with said actuating member when said lock is unlocked and said sleeve is decoupled from rotation with said actuating member when said lock is locked, said coupling means including a limited lost motion connection between said lock and said sleeve with said lock in the unlocked position, said limited lost motion connection permitting said lock to be operated between the locked and unlocked positions ove a limited range of rotation of said actuating means with respect to said sleeve, whereby, with said lock in the unlocked position, said actuating member may be manually rotated on said threaded shaft to tighten said sleeve as tightly thereon as desired and then said lock may be actuated to the locked position anywhere within said limited range of rotation provided by said limited lost motion connection without affecting the desired tightness with which said sleeve has been tightened on said threaded shaft.

2. A spare tire locking device according to claim 1 wherein said other bore is generally tangential to said one bore.

3. A spare tire locking device according to claim 2 wherein said two bores are arranged such that the axis of said other bore is radially outwardly of the side wall of said one bore.

4. A spare tire locking device according to claim 3 wherein said coupling means comprises rotatably mounted means rotatably mounted in said other bore and having a portion thereof movable through said opening into and out of said one bore upon rotation of said rotatably mounted means and means on said sleeve interengageable with said portion when said portion is disposed within said one bore for coupling said sleeve for rotation with said actuating member.

5. A spare tire locking device according to claim 4 wherein said means on said sleeve comprises means defining at least one axially extending element on the outer periphery of said sleeve opposite said opening and means defining a circumferentially extending recess adjacent said element, said portion being received within said recess when said lock is unlocked and being interengageable with said element upon rotation of said actuating member.

6. A spare tire locking device according to claim 5 wherein said recess comprises means defining a circumferentially continuous groove in said sleeve and said element comprises a key extending axially of said sleeve across said groove.

7. A spare tire locking device according to claim 2 wherein said coupling means comprises a rotatable member mounted for rotation in said other bore and interlocking means on said rotatable member movable through said opening into and out of said one bore in response to rotation of said rotatable member, said sleeve comprising means for radially overlapping said interlocking means when said interlocking means is disposed within said one bore.

8. A spare tire locking device according to claim 7 wherein said interlocking means comprises a dog on said rotatable member.

9. A spare tire locking device according to claim 8 wherein said dog comprises an arcuate edge portion having a radial dimension slightly less than the radius of said other bore and a straight edge portion connecting the ends of said arcuate edge portion, said dog being dimensioned such that said dog is exterior of said one bore when said straight edge portion is facing said one bore.

10. A spare tire locking device according to claim 1 wherein said limited lost motion connection is arranged to provide at least 180° of lost motion rotation between said actuating member and said sleeve.

11. A spare tire locking device according to claim 1 wherein said limited lost motion connection is arranged to provide a plurality of discontinuous arcuate segments of lost motion rotation between said actuating member and said sleeve.

* * * * *

UNITED STATES PATENT OFFICE
CERTIFICATE OF CORRECTION

Patent No. 3,807,204                    Dated April 30, 1974

Inventor(s) JOHN S. CUCHERAN

It is certified that error appears in the above-identified patent and that said Letters Patent are hereby corrected as shown below:

Column 3, line 28 (Claim 1, line 25) "ove" should be -- over --.

Signed and sealed this 27th day of August 1974.

(SEAL)
Attest:

McCOY M. GIBSON, JR.
Attesting Officer

C. MARSHALL DANN
Commissioner of Patents